US008757569B2

(12) United States Patent
Chen et al.

(10) Patent No.: US 8,757,569 B2
(45) Date of Patent: Jun. 24, 2014

(54) SUPPORTING APPARATUS FOR MONITOR

(75) Inventors: Yun-Lung Chen, New Taipei (TW); Liang-Chin Wang, New Taipei (TW); Gang Su, Wuhan (CN); Ling-Xin Zeng, Wuhan (CN); Zhong-Jie Liu, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 21 days.

(21) Appl. No.: 13/526,606

(22) Filed: Jun. 19, 2012

(65) Prior Publication Data

US 2013/0068901 A1 Mar. 21, 2013

(30) Foreign Application Priority Data

Sep. 20, 2011 (CN) .......................... 2011 1 0279586

(51) Int. Cl.
*A47F 5/00* (2006.01)

(52) U.S. Cl.
USPC ..................... 248/298.1; 248/279.1; 248/429; 248/225.11; 248/223.41

(58) Field of Classification Search
USPC .................. 248/225.11, 429, 223.41, 220.22, 248/279.1, 298.1, 124.1, 125.1, 125.7, 917, 248/282.1, 125.8, 74.2; 211/206, 207; 403/384
See application file for complete search history.

(56) References Cited

U.S. PATENT DOCUMENTS 2,531,348 A * 11/1950 Amesbury ...................... 24/290
2,767,951 A * 10/1956 Cousino ........................ 248/245
3,306,639 A * 2/1967 Lyon ............................. 403/107
4,516,751 A * 5/1985 Westbrook ................. 248/279.1
5,154,385 A * 10/1992 Lindberg et al. ......... 248/225.11
5,848,773 A * 12/1998 Bourassa ................... 248/298.1
6,105,794 A * 8/2000 Bauer ........................ 211/94.01
7,556,431 B2 * 7/2009 Chen .............................. 384/48
7,794,029 B2 * 9/2010 Peng et al. .................... 312/333
7,806,378 B2 * 10/2010 Oddsen, Jr. ............. 248/280.11
7,854,551 B2 * 12/2010 Lv et al. ........................ 378/189
8,162,268 B1 * 4/2012 Huang ....................... 248/124.1
8,282,052 B2 * 10/2012 Huang ....................... 248/125.1
8,534,615 B2 * 9/2013 Huang ....................... 248/125.1
2002/0080921 A1 * 6/2002 Smith et al. ................... 378/189
2005/0040299 A1 * 2/2005 Twyford .................... 248/177.1
2009/0078841 A1 * 3/2009 Oddsen, Jr. ................ 248/279.1
2009/0134285 A1 * 5/2009 Huang ....................... 248/124.1
2013/0021539 A1 * 1/2013 Austin et al. .................. 348/836
2013/0026311 A1 * 1/2013 Chen et al. ................. 248/125.7
2013/0026312 A1 * 1/2013 Wang et al. ................ 248/125.7

* cited by examiner

*Primary Examiner* — Terrell McKinnon
*Assistant Examiner* — Daniel J Breslin
(74) *Attorney, Agent, or Firm* — Novak Druce Connolly Bove + Quigg LLP

(57) ABSTRACT

A supporting apparatus includes a base member, a securing assembly secured to the base member, and a supporting assembly secured to the securing assembly. The supporting assembly includes a slid-way module and a bracket. The bracket is secured to the slid-way module and supports a monitor. The slid-way module includes a main body and an adjusting member. The main body includes two guiding ways and a sliding portion. The sliding portion is slidably engaged between the two guiding ways. The adjusting member includes a holding portion located between the sliding portion and the two guiding way, a resilient piece, and a controlling portion rotatably installed on the holding portion. The resilient piece is located between the holding portion and the controlling portion. The controlling portion is rotatable to deform the resilient piece to adjust friction force between the holding portion and the two guiding ways.

20 Claims, 7 Drawing Sheets

30
5
20
80
10
13
11

SUPPORTING APPARATUS FOR MONITOR

BACKGROUND

1. Technical Field

The present disclosure relates to supporting apparatuses, and particularly to a supporting apparatus for a monitor.

2. Description of Related Art

In a computer system, a monitor is secured to a supporting apparatus. A typical supporting apparatus includes a base member stably seated on a horizontal plane such as a desk, and a hinge connecting the base member to the monitor. Thus, the monitor can be tilted upwards or downwards to a desired viewing angle. However, users may need to adjust the monitor in a right direction or a left direction, and it is inconvenient and laborious to adjust the supporting apparatus synchronistically with the monitor.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
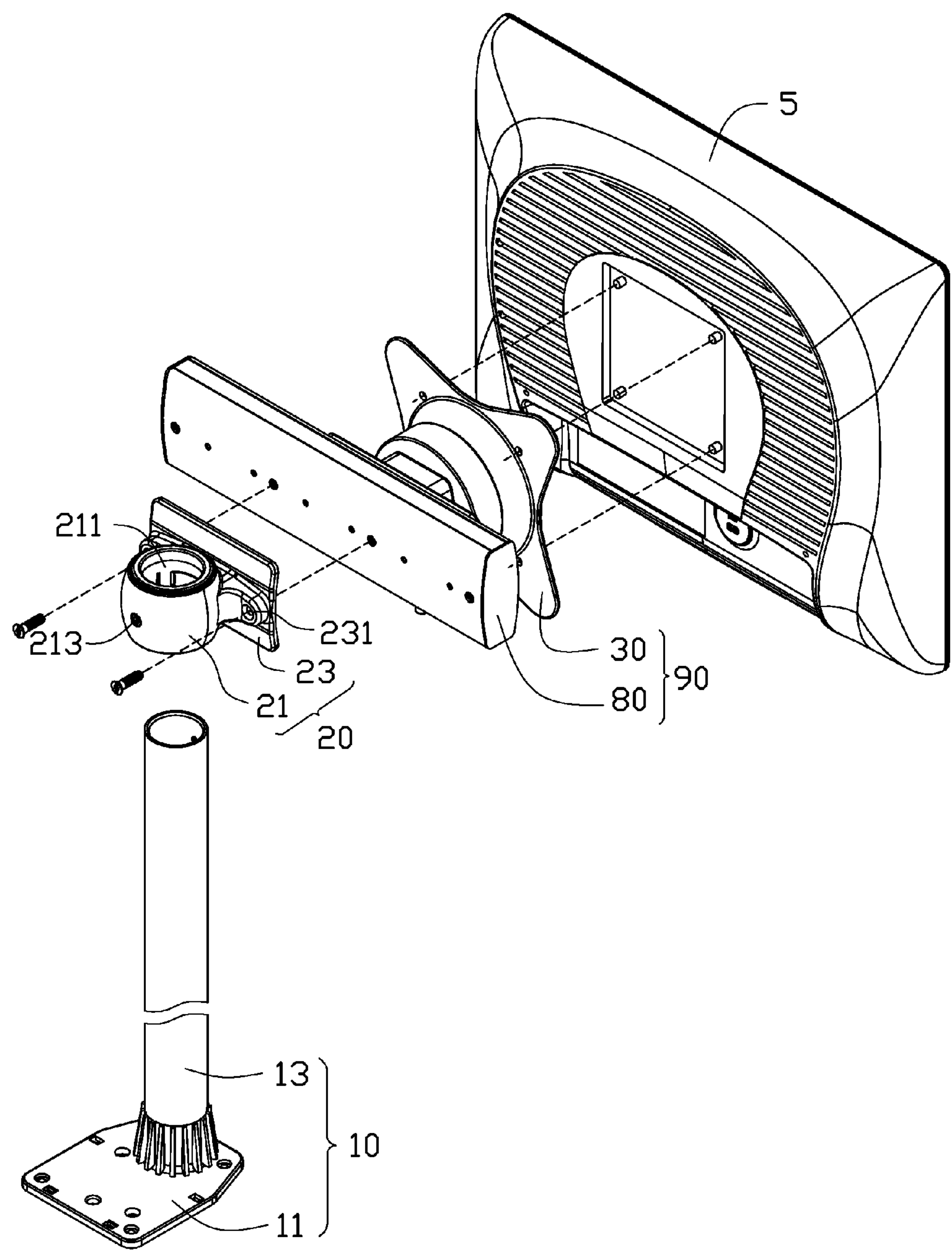
FIG. 1 is an exploded, isometric view of an embodiment of a monitor and a supporting apparatus.

FIG. 1, illustrates a supporting apparatus of one embodiment. In this embodiment, the supporting apparatus supports a monitor 5. The supporting apparatus includes a base member 10, a securing assembly 20 and a supporting assembly 90.

The base member 10 includes a bottom board 11 and a post 13. The post 13 is connected to the bottom board 11, and the bottom board 11 stands steadily on a plane (not shown) such as a desk. In one embodiment, the post 13 is substantially hollow columnar.

The securing assembly 20 includes a fixing portion 21, a fixing board 23, and a modulating member (not shown). The fixing portion 21 defines a through hole 211 running through the fixing portion 21. A modulating hole 213 is defined in an outer sidewall of the fixing portion 21 and communicating with the through hole 211. The modulating member rotatably engages in the modulating hole 213. In one embodiment, the modulating member may be, such as a screw or bolt. The fixing board 23 defines two first fixing holes 231.

Figure 2:
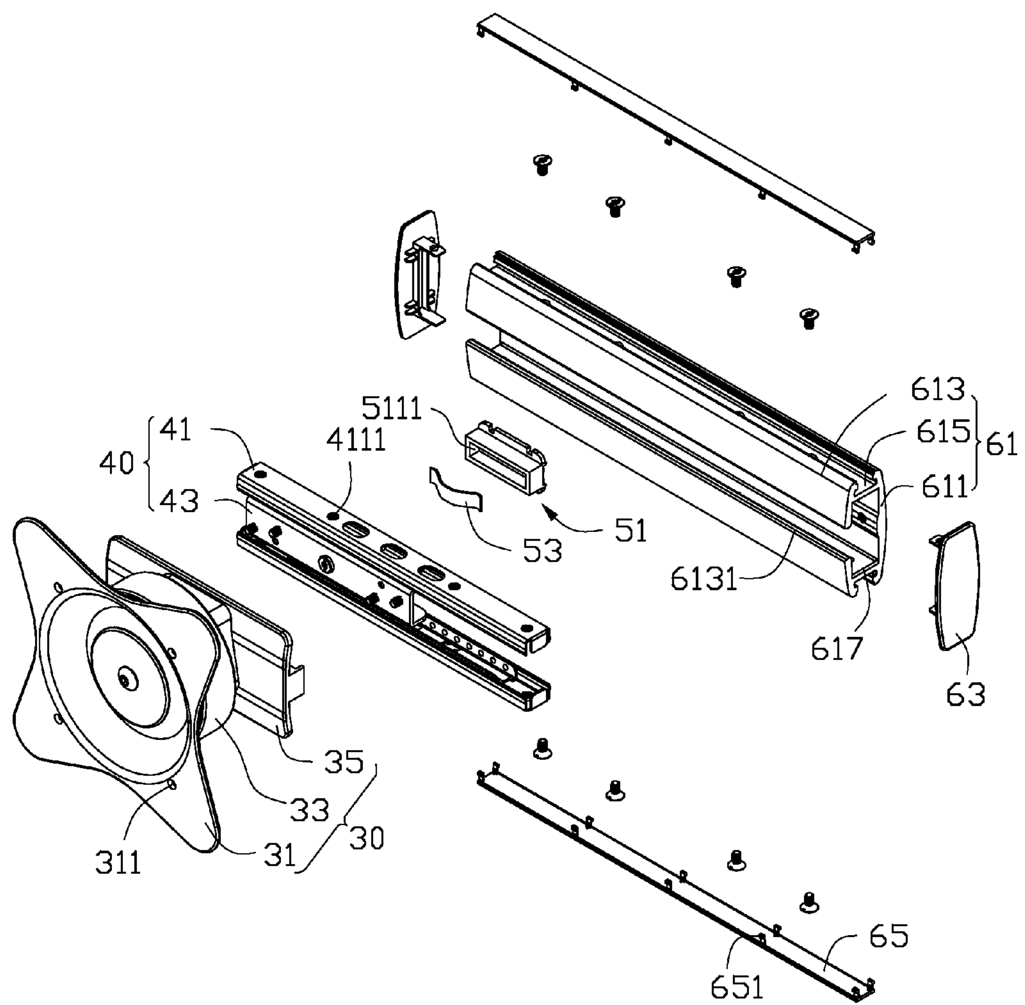
FIG. 2 is an exploded view of a supporting assembly of FIG. 1.
Figure 3:
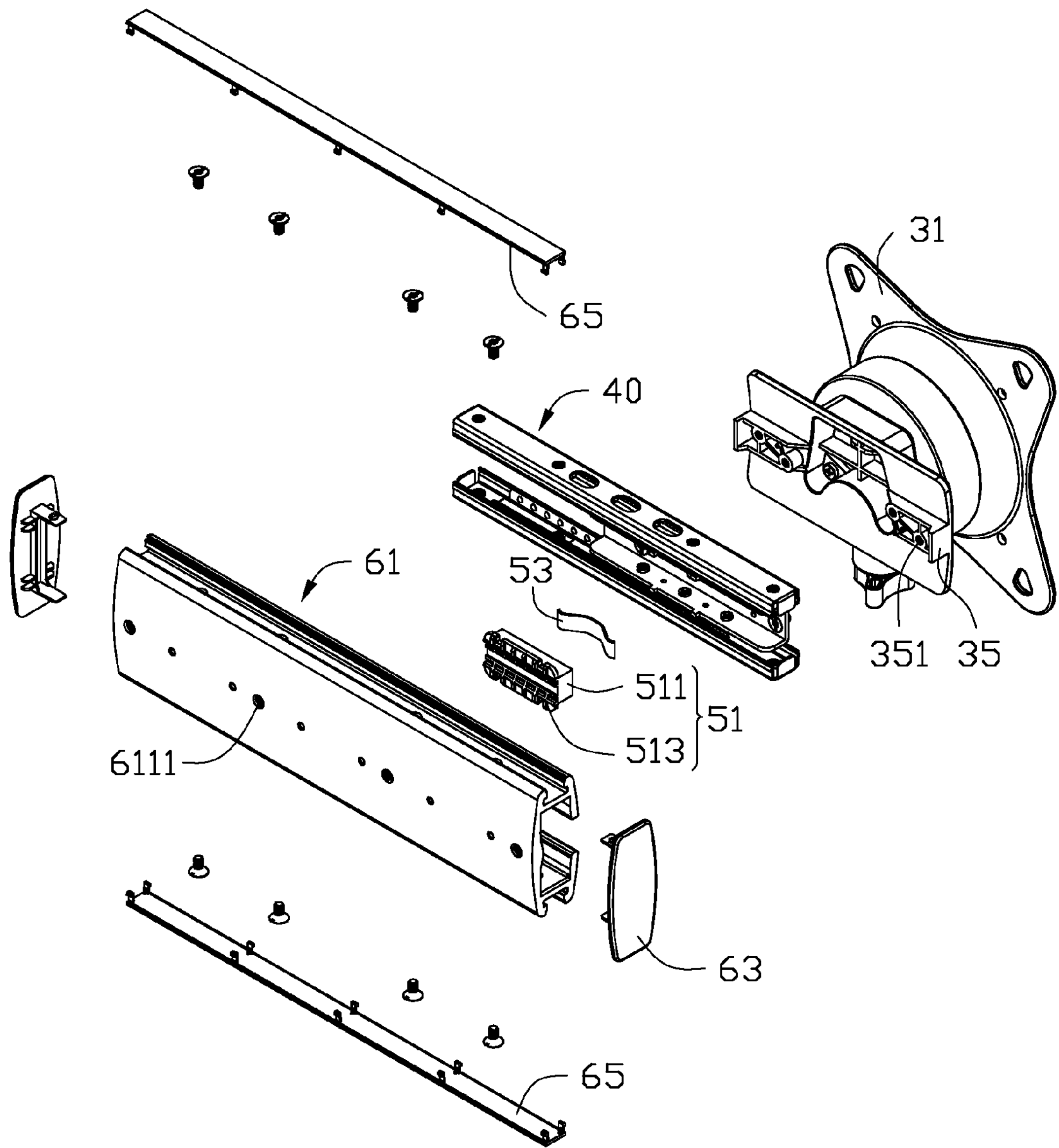
FIG. 3 is similar to FIG. 2, but viewed from a different aspect.1.

Referring to FIGS. 1-3, the supporting assembly 90 includes a bracket 30 and a slid-way module 80. The bracket 30 includes a supporting plate 31, a connecting portion 33 and a latch board 35. The supporting plate 31 defines four second fixing holes 311. In one embodiment, the four second fixing holes 311 are at the four corners of the supporting plate 31. The latch board 35 defines a plurality of first latch holes 351.

Figure 4:
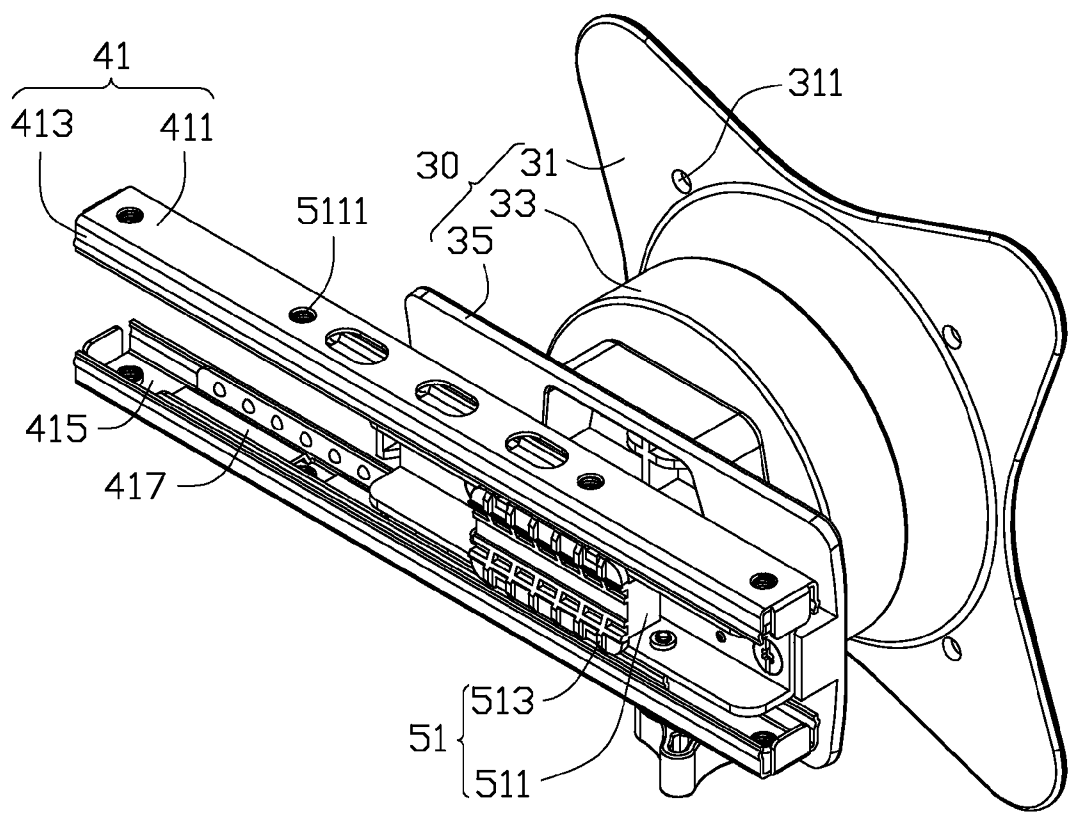
FIG. 4 is an assembled view of the supporting assembly of FIG. 3.

The slid-way module 80 includes a main body 40, an adjusting member 50 and an enclosure 60. The main body 40 includes two guiding ways 41 and a sliding portion 43. Each of the two guiding ways 41 includes a supporting board 411 and two blocking boards 413. The two blocking boards 413 extend from two opposite sides of the supporting board 411. Each of the two blocking board 413 defines a plurality of first limiting holes 4111. The supporting board 411 and the two blocking boards 413 cooperatively define a first sliding slot 415 (shown in FIG. 4). A second sliding slot 417 (shown in FIG. 4) is received in the first sliding slot 415. A plurality of sliding balls 4171, (shown in FIG. 6), are located on two opposite sidewalls of the second sliding slot 417.

The sliding portion 43 includes a retaining portion 431 and two slipping portions 433. The retaining portion 431 includes a limiting piece 4311 and two touching pieces 4313. The two touching pieces 4313 extend from two opposite sides of the limiting piece 4311. In one embodiment, the two touching pieces 4313 are substantially parallel to each other and substantially perpendicularly connected to the limiting piece 4311. The limiting piece 4311 and the two touching pieces 4313 cooperatively define a receiving space 4315. The limiting piece 4311 defines a plurality of second latch holes (not shown) corresponding to the first latch holes 351 and a threaded hole (not shown) on a center of the limiting piece 4311. The two slipping portions 433 are separately secured to the two touching pieces 4313 by screws and slidably received in the second slots 417 to engage with the corresponding sliding balls 4171.

Figure 5:
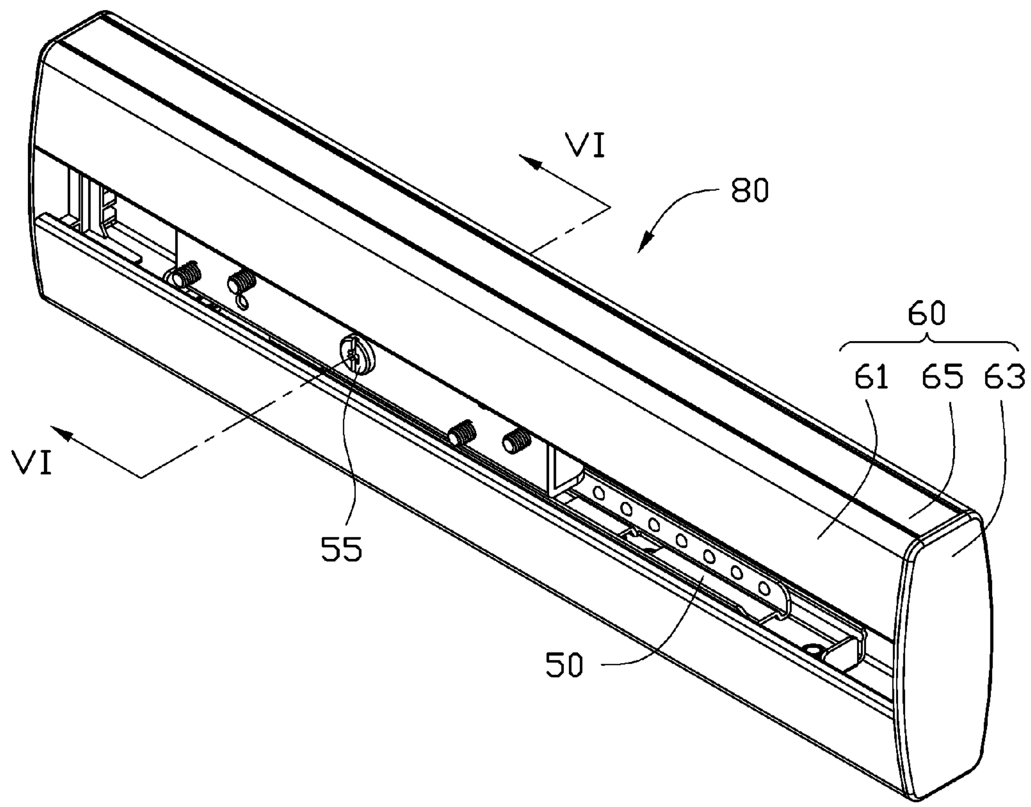
FIG. 5 is an assembled view of a slid-way module of FIG. 2.

The adjusting member 50 (shown in FIG. 6) includes a holding portion 51, a resilient piece 53 and a controlling portion 55 (shown in FIG. 5). The holding portion 51 includes a receiving portion 511 and two stopping portions 513 located on two opposites sides of the receiving portion 511. The receiving portion 511 defines a receiving slot 5111. The receiving slot 5111 receives the resilient piece 53. The controlling portion 55 is rotatably engaged in the threaded hole and aligned with the receiving slot 5111. In one embodiment, the controlling portion 55 may be a screw.

Referring to FIG. 2, the enclosure 60 includes a housing 61, two first covers 63 and two second covers 65. The housing 61 includes a rear board 611, a front board 613 and two side boards 615 connected to the rear board 611 and the front board 613. The rear board 611 defines two second fixing holes 6111 corresponding to the two first fixing holes 231. The rear board 611, the front board 613 and two side boards 615 cooperatively define an installation slot 617. The installation slot 617 receives the main body 40. The front board 613 defines a gap 6131 communication with the installation slot 617. Each of the two side boards 615 defines a plurality of a second limiting hole (not labeled) corresponding to the first limiting hole 4111. Two first hooks 631 (shown in FIG. 6) are located on each of the two first covers 63 to engage the two first covers 63 with the housing 61. Two second hooks 651 are located on each of the two second covers 65 to engage the two second covers 65 to the housing 61.

Figure 6:
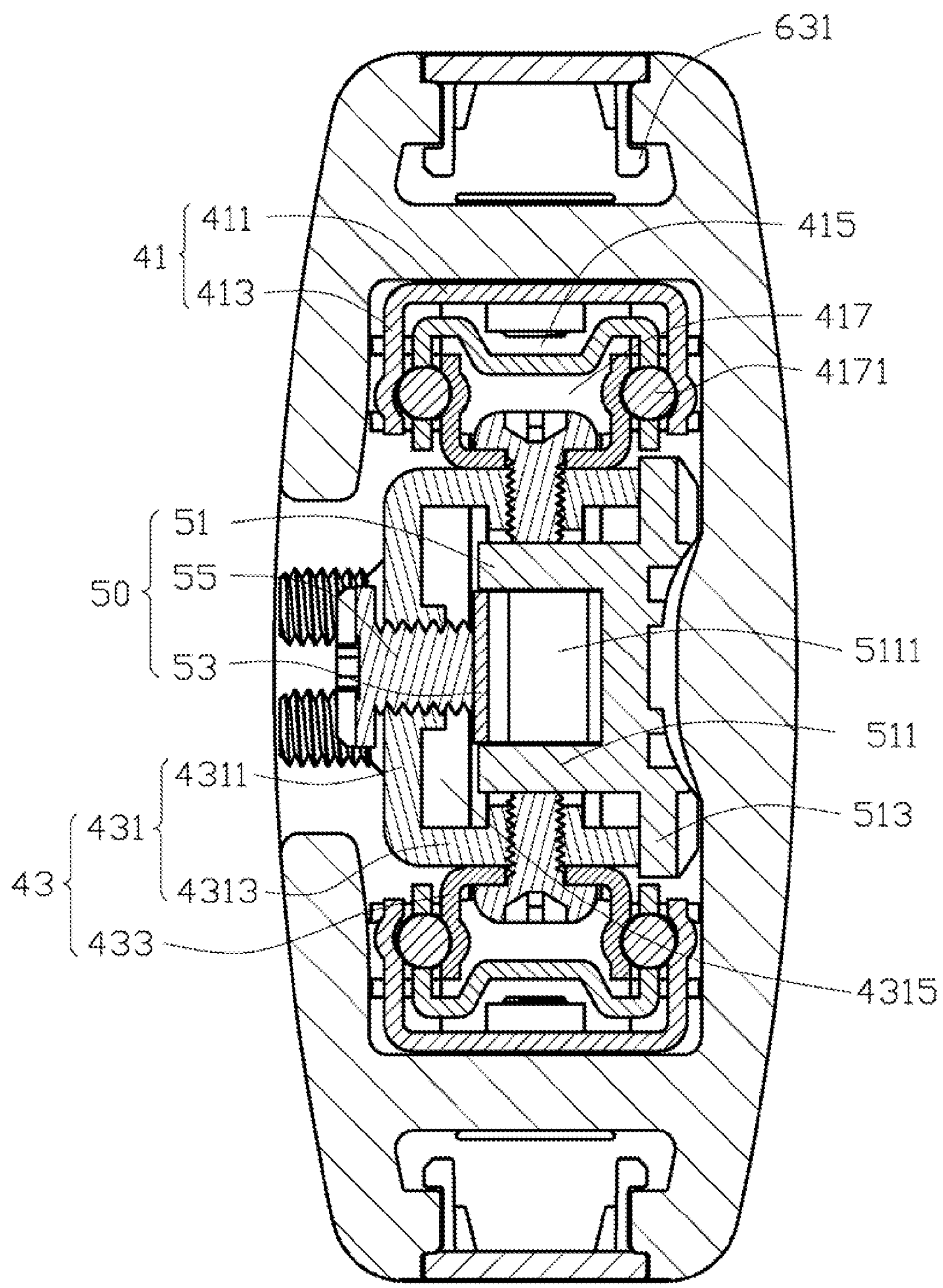
FIG. 6 is a cross-sectional view of the slid-way module of FIG. 5, taken along the line VI-VI.
Figure 7:
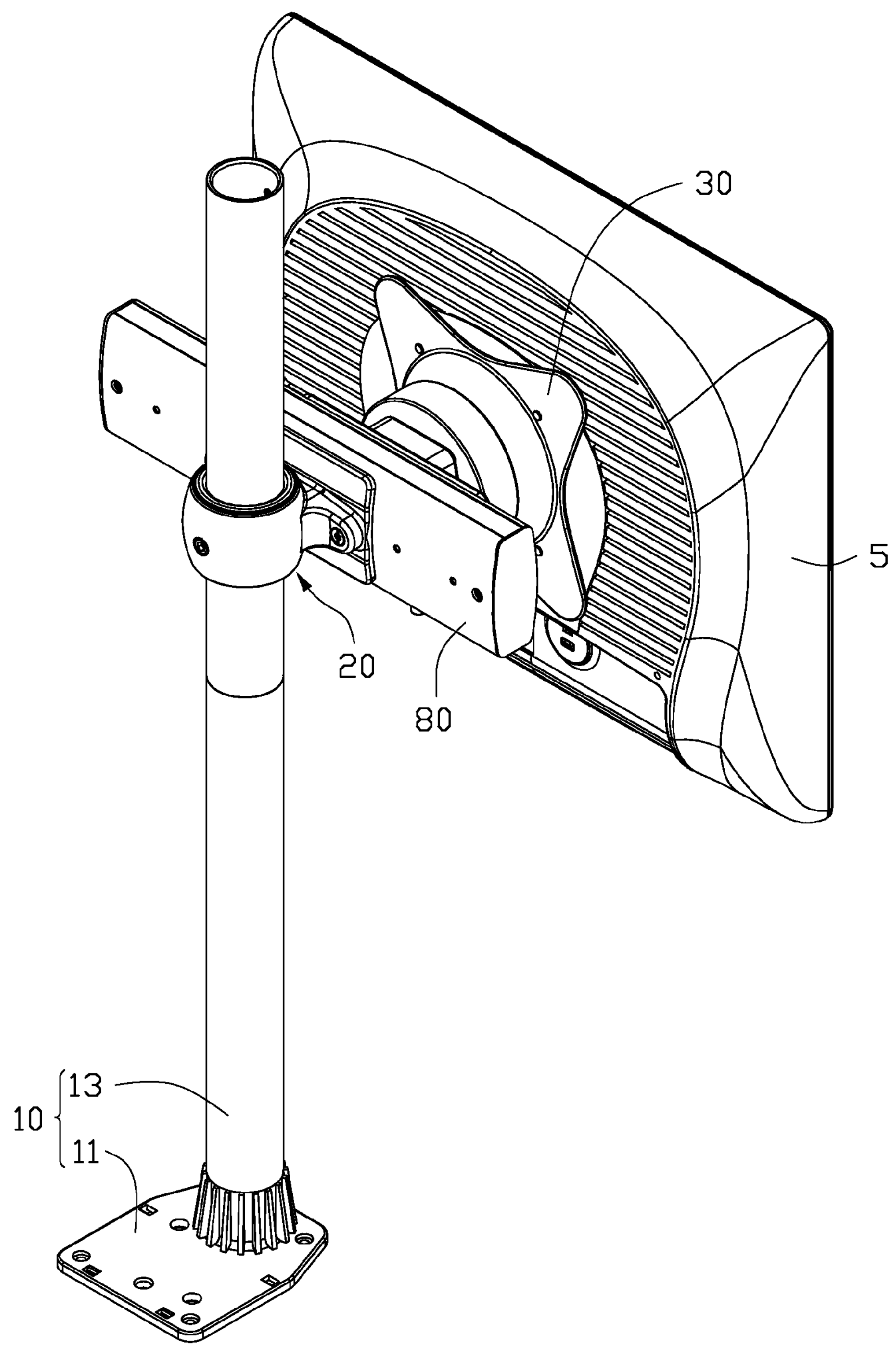
FIG. 7 is an assembled view of the monitor and the supporting apparatus of FIG. 1.

Referring to FIGS. 5-7, in assembly, the adjusting member 50 is movable to be received in the receiving space 4315. Each of the two stopping portions 513 is located between each of the blocking board 413 and each of the two touching pieces 4313. The latch board 35 abut the limiting piece 4311 to align the second latch holes with the first latch holes 351, and fasteners are inserted into the second latch holes and the first latch holes 351 to secure the bracket 30 to the main body 40.

The main body 40 and the adjusting member 50 are received in the installation slot 617 of the enclosure 60, and the bracket 30 exposed on the enclosure 60. The first limiting holes 4111 are aligned with the second limiting holes, and fasteners are locked into the first limiting holes 4111 and the second limiting holes. The four covers 63 are installed on the housing 61.

The two second fixing holes 6111 of the supporting assembly 90 are aligned with the two first fixing holes 231 of securing assembly 20, and the fasteners are locked into the fixing holes 231 and the second fixing holes 6111 to secure the supporting assembly 90 to the securing assembly 20.

The post 13 extends through the through hole 211, and a modulating member is rotated to secure the securing assembly 20, the supporting assembly 90 to the base member 10.

In use, the sliding portion 43 is slide along two guiding ways 41 to adjust position of the monitor 5 in a first direction. The modulating member is rotated to be moved towards the limiting piece 4311 to deform the resilient piece 53 to resist the holding portion 51. The stopping portions 513 abut the blocking boards 413 to adjust force of friction among the adjusting member and the two guiding ways 41 to reduce a movable speed of the monitor 5. The modulating member is rotated to move away from the limiting piece 4311 to release the resilient piece 53 to adjust the force of friction among the adjusting member and the two guiding ways 41 to accelerate the movable speed of the monitor 5.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A supporting apparatus comprising:

a base member;

a securing assembly pivotally secured to the base member; and a supporting assembly secure to the securing assembly, the supporting assembly comprising a slid-way module, an enclosure and a bracket, the bracket being secured to the slid-way module and configured to support a monitor; the enclosure comprising a housing and two first covers, two first hooks being located on each of the two first covers and engaged with the housing; the slid-way module secured to the housing comprising a main body and an adjusting member, the main body comprising two guiding ways and a sliding portion, and the sliding portion being slidably engaged between the two guiding ways; the adjusting member comprising a holding portion, a resilient piece, and a controlling portion; the holding portion being located between the sliding portion and the two guiding ways, the controlling portion being rotatably installed on the sliding portion, and the resilient piece being located between the holding portion and the controlling portion; the controlling portion is rotatable to deform the resilient piece to adjust friction forces between the holding portion and the two guiding ways.

2. The supporting apparatus of claim 1, wherein the holding portion comprises a receiving portion, the receiving portion defines a receiving slot, and the resilient piece is received in the receiving slot.

3. The supporting apparatus of claim 2, wherein the holding portion further comprises two stopping portions extending from two opposite sides of the receiving portion, and each of the two stopping portions is engaged between the sliding portion and one of the two guiding ways.

4. The supporting apparatus of claim 1, wherein the sliding portion comprises two slipping portions, each of the two guiding ways defines a first sliding slot and a second sliding slot received in the first sliding slot, a plurality of sliding balls are located on two opposite sidewalls of the second sliding slot, and each of the two slipping portions is slidably engaged with the plurality of sliding balls.

5. The supporting apparatus of claim 4, wherein the sliding portion further comprises a retaining portion, the retaining portion comprises a limiting piece and two touching pieces located on two opposite sides of the limiting piece, the controlling portion is rotatably installed on the limiting piece, and each of the two slipping portions is secured to each of the two touching pieces.

6. The supporting apparatus of claim 5, wherein the limiting piece and the two touching piece cooperatively define a receiving space, and the holding portion is received in the receiving space.

7. The supporting apparatus of claim 5, wherein the two touching pieces are substantially parallel to each other.

8. The supporting apparatus of claim 4, wherein each of the two guiding ways comprises a supporting board and two blocking boards located on two opposite sides of the supporting board, the supporting board and the two blocking boards cooperatively define the first sliding slot.

9. The supporting apparatus of claim 1, wherein the housing defines an installation slot, and the main body is received in the installation slot.

10. The supporting apparatus of claim 9, wherein the housing comprises a rear board, two boards and a front board, the rear board, the two sidewall boards and the front board cooperatively define the installation slot, and the front board defines a gap communication with the installation slot.

11. A supporting apparatus comprising:

a base member comprising a post;

a securing assembly pivotally secured to member the post; and a supporting assembly secure to the securing assembly, the supporting assembly comprising a slid-way module and a bracket, the bracket being secured to the slid-way module and configured to support a monitor; the slid-way module comprising a main body, an enclosure, and an adjusting member, the enclosure comprising a housing and two first covers, two first hooks located on each of the two first covers and engaged with the housing; the main body being received in the housing and comprising two guiding ways and a sliding portion, the sliding portion being slidably engaged between the two guiding ways; the adjusting member comprising a holding portion, a resilient piece, and a controlling portion, the holding portion being located between the sliding portion and the two guiding ways, the controlling portion being rotatably installed on the sliding portion, and the resilient piece being located between the holding portion and the controlling portion; the controlling portion is rotatable to deform the resilient piece to adjust friction forces between the holding portion and the two guiding ways.

12. The supporting apparatus of claim 11, wherein the holding portion comprises a receiving portion, the receiving portion defines a receiving slot, and the resilient piece is received in the receiving slot.

13. The supporting apparatus of claim 12, wherein the holding portion further comprises two stopping portions extending from two opposite sides of the receiving portion, and each of the two stopping portions is engaged between the sliding portion and one of the two guiding ways.

14. The supporting apparatus of claim 11, wherein the sliding portion comprises two slipping portions, each of the two guiding ways defines a first sliding slot and a second sliding slot received in the first sliding slot, a plurality of sliding balls are located on two opposite sidewalls of the second sliding slot, and each of the two slipping portions is slidably engaged with the plurality of sliding balls.

15. The supporting apparatus of claim 14, wherein the sliding portion further comprises a retaining portion, the retaining portion comprises a limiting piece and two touching pieces located on two opposite sides of the limiting piece, the controlling portion is rotatably installed on the limiting piece, and each of the two slipping portions is secured to each of the two touching pieces.

16. The supporting apparatus of claim 15, wherein the limiting piece and the two touching piece cooperatively define a receiving space, and the holding portion is received in the receiving space.

17. The supporting apparatus of claim 15, wherein the two touching pieces are substantially parallel to each other.

18. The supporting apparatus of claim 14, wherein each of the two guiding ways comprises a supporting board and two blocking boards located on two opposite sides of the supporting board, the supporting board and the two blocking boards cooperatively define the first sliding slot.

19. The supporting apparatus of claim 11, wherein the enclosure comprises a housing, the housing defines an installation slot, and the main body is received in the installation slot.

20. The supporting apparatus of claim 19, wherein the housing comprises a rear board, two sidewalls and a front board, the rear board, the two sidewall boards and the front board cooperatively define the installation slot, and the front board defines a gap communication with the installation slot.

* * * * *